3,219,528
COMPOSITIONS FOR TREATMENT OF EMESIS AND BEHAVIOR DISTURBANCES
Michel Leon Thominet, Paris, France, assignor to Societe d'Etudes Scientifiques et Industrielles de l'Ile-de-France, Paris, France
No Drawing. Filed July 17, 1962, Ser. No. 210,556
Claims priority, application France, July 25, 1961, 869,010, 869,011, 869,012; Aug. 5, 1960, 835,232; Nov. 4, 1960, 843,089
15 Claims. (Cl. 167—65)

This application is a continuation in part of application of the copending application S.N. 124,314, filed July 17, 1961, now abandoned.

This invention relates to compositions and methods for the treatment of emesis and behavior disturbances.

The compositions used for the treatment of emesis or behavior disturbances in accordance with this invention are substituted benzamides having the formula:

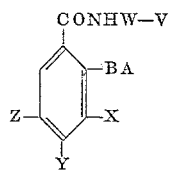

in which V is a member selected from the class consisting of groups having the formulas:

or

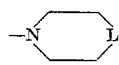

in which $R_1$ and $R_2$ are lower alkyl groups such as the methyl, ethyl, propyl or isopropyl group; L is oxygen, the methylene group or a group having the formula: NR in which R is hydrogen, a lower alkyl group, such as a methyl or isopropyl group, or a lower alkylsulfamoyl group; W is an alkylene group, such as the ethylene, propylene, methyl ethylene or 2-methyl propylene group; A is a lower alkyl group, such as the methyl, isopropyl, or isobutyl group; B is sulfur or oxygen; and X, Y and Z are hydrogen, halogens, such as chlorine, bromine or fluorine, lower alkoxy groups, such as the methoxy, ethoxy, isopropoxy and butoxy group, the nitro group, the amino group, lower alkylamino groups, such as the methylamino or isobutylamino group, di lower alkylamino groups, such as the diethylamino or dipropylamino group, lower acyl groups, such as $COCH_3$ or $COC_2H_5$, lower acylamino groups, the cyano group, lower alkylmercapto groups, such as the mercaptomethyl, mercaptoethyl or mercaptobutyl group, the sulfamoyl group, lower alkylsulfamoyl groups, such as the methylsulfamoyl or butysulfamoyl group, di lower alkylsulfamoyl groups, such as the dipropylsulfamoyl group, or halomethyl groups, such as the trichloromethyl, tribromomethyl or trifluoromethyl group.

The substituted benzamides of the present invention are prepared from substituted 2-alkoxy benzoic acids or substituted 2-alkylthio benzoic acids as follows:

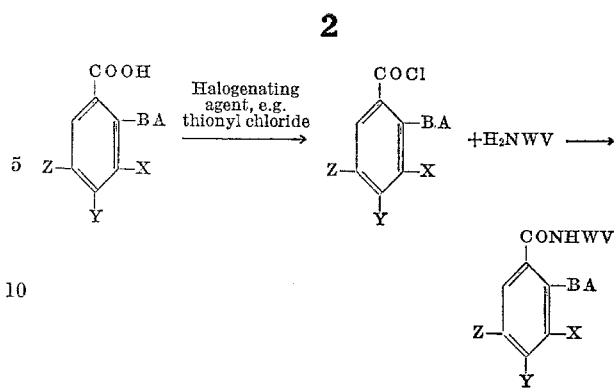

in which W, V, B, A, X, Y and Z have the same meanings as heretofore specified.

In the first stage, the substituted 2-alkoxy benzoic acid or substituted 2-alkylthio benzoic acid is converted to the corresponding acid chloride by treatment with an appropriate halogenating agent, such as thionyl chloride. In the second stage, the resulting substituted benzoyl halide obtained, such as the substituted benzoyl chloride, is reacted in an inert solvent with the disubstituted diamine so that the hydrohalide, such as the hydrochloride of the basic benzamide obtained may be recoverable in a relatively pure state by filtration or centrifugation. The disubstituted diamine used as a reactant has the formula:

$$H_2NWV$$

Under these conditions, the hydrochloric acid formed, for example, in the course of the reaction neutralizes the tertiary amine function of the benzamide formed. Examples of inert solvents in which the reaction occurs are: acetone, methyl ethyl ketone, benzene, toluene and ether. The reaction is conducted at low temperature, a temperature between 0 and 5° C. giving a good result.

The acid salts of the substituted 2-alkoxy benzamides and the substituted 2-alkylthio benzamides are produced by causing the benzamide base to react with an acid such as hydrochloric acid, hydrobromic acid, hydroiodic acid, phosphoric acid, sulfuric acid, citric acid, tartaric acid and lactic acid. Certain acids, such as ethane sulfonic acid and diphenylacetic acid, produce salts which are substantially insoluble in water and which permit a slow absorption of the composition when administered, thereby effecting prolonged action of the composition.

The quaternary ammonium salts are obtained by reacting the substituted benzamide base with an aliphatic or aromatic agent such as methyl chloride, methyl bromide, methyl iodide, dimethyl sulfate, methyl benzene sulfonate, methyl p-toluene sulfonate, ethyl bromide, propyl bromide and benzyl chloride.

The substituted benzamides of this invention possess significant pharmacological properties and may be used for the treatment of emesis associated with many conditions, such as pregnancy and seasickness, and behavior disturbances. For this purpose, the substituted benzamides or their salts may be incorporated in or combined with pharmaceutically acceptable carriers.

A more comprehensive understanding of this invention is obtained by reference to the following examples.

EXAMPLE I

*N-(2-diethylaminoethyl)-2-methoxy-5-dimethyl-sulfamoylbenzamide*

69 grams (0.27 mole) of 2-methoxy-5-dimethylsulfamoylbenzoic acid are heated for 2½ hours with 64 g. (0.54 mole) of thionyl chloride. The solution obtained is added while it is still warm to 250 cc. of petroleum ether. The 2-methoxy-5-dimethyl sulfamoylbenzoyl chloride is precipitated, centrifuged, washed with petroleum ether, and dried under vacuum. 72 grams of product are obtained, representing a yield of 97%.

The 72 g. of 2-methoxy-5-dimethyl-sulfamoylbenzoyl chloride are dissolved in 100 cc. of methyl ethyl ketone and introduced drop by drop in 30 g. (0.26 mole) of N,N-diethylethylene diamine previously dissolved in 200 cc. of methyl ethyl ketone, the temperature being maintained between 0 and 5° C. during the reaction.

The N-(2-diethylaminoethyl)-2-methoxy-5-dimethyl sulfamoylbenzamide hydrochloride which is precipitated, centrifuged and washed on the filter with methyl ethyl ketone. The yield is 86% of a product having a melting point of 133–134° C.

The corresponding N-(2-diethylaminoethyl)-2-methoxy-5-methylsulfamoylbenzamide hydrochloride is prepared in the same manner as described in this example except that 2-methoxy-5-methylsulfamoylbenzoic acid is used as the starting material instead of 2-methoxy-5-dimethyl-sulfamoylbenzoic acid.

EXAMPLE II

*N-(2-diethylaminoethyl)-2-methoxy-5-sulfamoylbenzamide*

This compound is prepared in the same manner as in Example I. Starting with 66 g. (0.3 mole) of 2-methoxy-5-sulfamoylbenzoic acid, 55 g. (80% yield) of N-(2-diethylaminoethyl)-2-methoxy-5-sulfamoylbenzamide are obtained, having a melting point of 183–185° C.

EXAMPLE III

*N-(tertiary aminoalkyl)-2-methoxy-3,5-dichlorobenzamide salts*

88 grams (0.4 mole) of 2-methoxy-3,5-dichlorobenzoic acid are heated on a water bath with 92 g. (0.8 mole) of thionyl chloride until totally disolved, which requires about 8½ hours. The excess of thionyl chloride is expelled and the 2-methoxy-3,5-dichlorobenzoyl chloride formed is distilled. A yield of 72% is obtained, having a boiling point of 146–148° C. and a melting point of 42° C.

The 70 g. of acid chloride obtained (72% yield) are dissolved in 50 cc. of methyl ethyl ketone and poured drop by drop, at a temperature between 0 and 5° C., into a solution of 34 g. of N,N-diethylethylene diamine dissolved in 100 cc. of methyl ethyl ketone.

The N-(3-diethylaminoethyl)-2-methoxy-3,5-dichlorobenzamide hydrochloride formed crystallizes at the end of the reaction and solidifies into a mass. It is filtered and washed with methyl ethyl ketone. It is white material with a melting point of 114–115° C. The yield is 89%. By recrystallization in acetone (1 g. in 2 cc. of warm acetone), a very white material can be obtained.

By the same procedure described in this example, the following compounds may be prepared from 2-methoxy-3,5-dichlorobenzoyl chloride:

N-(2-dimethylaminoethyl)-2-methoxy-3,5-dichlorobenzamide hydrochloride by reacting the acid chloride with N,N-dimethylethylene diamine. (Melting point of 80° C. with one molecule of water of crystallization; melting point of 147° C. in the anhydrous condition.)

N-(3-diethylaminopropyl)-2-methoxy-3,5-dichlorobenzamide hydrochloride by reacting the acid chloride with γ-diethylamino propylamine. The melting point is 87–90° C.

N-(piperidinoethyl)-2-methoxy-3,5-dichlorobenzamide hydrochloride, by reacting the acid chloride with piperidino ethylamine. The melting point is 111–112° C.

N-(morpholinoethyl)-2-methoxy-3,5-dichlorobenzamide hydrochloride, by reacting the acid chloride with morpholinoethylamine. The melting point is 87–88° C.

N-(methyl-4-piperazinoethyl)-2-methoxy-3,5-dichlorobenzamide hydrochloride by reacting the acid chloride with 4-methylpiperazino ethylamine. The melting point is 153° C.

The salts of N-(tertiary aminoalkyl)-2-methoxy-3-fluoro-5-chlorobenzamide may be prepared in a similar manner. For this purpose, 2-methoxy-3-fluoro-5-chlorobenzoic acid is employed instead of 2-methoxy-3,5-dichlorobenzoic acid as the starting material.

N-(diethylaminoethyl)-2-methylthio-3,5-dichlorobenzamide hydrochloride is produced in the same manner as described for the production of N-(diethylaminoethyl)-2-methoxy-3,5 dichlorobenzamide hydrochloride except that 2-methylthio-3,5-dichlorobenzoic acid is employed as the starting material instead of the 2-methoxy-3,5-dichlorobenzoic acid. N-(diethylaminoethyl)-2-methylthio-3,5 dichlorobenzamide hydrochloride has a $DL_{50}$ of 34.3 mg./kg. of body weight, as contrasted with a $DL_{50}$ of 29.6 mg./kg. of body weight for N-(diethylaminoethyl)-2-methoxy-3,5 dichlorobenzamide hydrochloride.

EXAMPLE IV

*N-(2-diethylaminoethyl)-2-isopropyloxy-3,5-dichlorobenzamide*

In a manner similar to that described in Example III, by starting with N-(2-diethylaminoethyl)-2-isopyropyloxy-3,5-dichlorobenzoyl chloride and the N-N-diethylethylene diamine, there is obtained the phosphate of N-(2-diethylaminoethyl)-2-isopropyloxy-3,5-dichlorobenzamide, having a melting point of 113–115° C. in a yield of 81%; and likewise, starting with 2-ethoxy-3,5-dichlorobenzoyl chloride and N,N-diethylethylene diamine, there is obtained N-(2-diethylaminoethyl)-2-ethoxy-3,5-dichlorobenzamide, the phosphate of which melts at 124° C.

EXAMPLE V

*N-(2-diethylaminoethyl)-2-methoxy-3,5-dichlorobenzamide methiodide*

To 87 g. (0.27 mole) of N-(2-diethylaminoethyl)-2-methoxy-3,5-dichlorobenzamide dissolved in 250 cc. of acetone, is added 38 g. (0.27 mole) of methyl iodide dissolved in 50 cc. of acetone. Rapid crystallization of methiodide occurs with heating. The mixture is cooled, allowed to stand for one night, centrifuged, washed in acetone and dried.

The methiodide of N-(2-diethylaminoethyl)-2-methoxy-3,5-dichlorobenzamide is recrystallized from 210 cc. of acetone. 120 grams of product having a melting point of 164–165° C. are obtained, representing a yield of 90%.

EXAMPLE VI

*N-(2-diethylaminoethyl)-2-methoxy-3,5-dichlorobenzamide diphenylacetate*

60 grams (0.17 mole) of N-(2-diethylaminoethyl)-2-methoxy-3,5-dichlorobenzamide hydrochloride are dissolved in 90 cc. of water. 36 grams (0.17 mole) of diphenylacetic acid are converted to the sodium salt by addition of 17 cc. of 10 N sodium hydroxide and 60 cc. of water. The two solutions are mixed. The crystallization is slow, requiring two days for completion. The precipitate is centrifuged and washed with water until the chloride ions disappear.

This salt, substantially insoluble in water, can be utilized in slow-acting therapeutic materials.

EXAMPLE VII

*N-(2-diethylaminoethyl)-2-methoxy-3,5-dibromobenzamide*

In the same manner as in Example III, by starting with 2-methoxy-3,5-dibromobenzoyl chloride and treating it with N,N-diethylethylene diamine, N-(2-diethylaminoethyl)-2-methoxy-3,5-dibromobenzamide is obtained.

67 grams (0.2 mole) of 2-methoxy-3,5-dibromobenzoyl chloride and 23 g. (0.2 mole) of N,N-diethylethylene diamine are reacted and the hydrochloride formed is dissolved in 300 cc. of water. It is made alkaline with 30 cc. of ammonia, and the liberated base extracted with 200 cc. of methylene chloride. The solution is washed with water. The methylene chloride is distilled off and 72 g. of base are obtained (87% yield) which are dissolved in 100 cc. of absolute alcohol. 30 grams of 85% phosphoric acid dissolved in 50 cc. of absolute alcohol are added. N-(2-diethylaminoethyl) - 3,5 - dibromobenzamide phosphate is precipitated, is centrifuged and washed. It is a clear beige material, having a melting point of 127–128° C.

EXAMPLE VIII

*N-(2-diethylaminoethyl)-2-methoxy-3-chloro-5-bromobenzamide*

In the same manner as in Example III, starting with 2-methoxy-3-chloro-5-bromobenzoyl chloride and the N,N-diethylethylene diamine, there is obtained N-(2-diethylaminoethyl) - 2 - methoxy-3-chloro-5-bromobenzamide phosphate. It is a clear beige material, having a melting point of 134–135° C.

EXAMPLE IX

*N-(2-diethylaminoethyl)-2-methoxy-3-bromo-5-chlorobenzamide*

In the same manner as in Example III, starting with 2-methoxy-3-bromo-5-chlorobenzoyl chloride and N,N-diethylethylene diamine, N-(2-diethylaminoethyl)-2-methoxy-3-bromo-5-chlorobenzamide phosphate is obtained. It is a solid white material having a melting point of 126–127° C.

EXAMPLE X

*N-(2-diethylaminoethyl)-2-methoxy-3-chloro-5-fluorobenzamide*

In the same manner as in Example III, starting with 2-methoxy-3-chloro-5-fluorobenzoyl chloride and N,N-diethylethylene diamine, N - (2 - diethylaminoethyl) - 2-methoxy-3-chloro-5-fluorobenzamide hydrochloride is obtained in a yield of 85%. It is a solid white material with a melting point of 125–126° C.

EXAMPLE XI

*N-(2-diethylaminoethyl)-2-methoxy-3-chloro-5-methoxybenzamide*

61 grams (0.281 mole) of 2,5-dimethoxy-3-chlorobenzoic acid are heated for 5 hours on a water bath with 67 g. (0.56 mole) of thionyl chloride. The excess of thionyl chloride is removed under vacuum. The 2,5-dimethoxy-3-chlorobenzoyl chloride formed crystallizes. It is recovered with 200 cc. of petroleum ether, centrifuged, washed with petroleum ether and dried over phosphorus pentoxide. 59 grams of product are obtained, representing a yield of 92%.

These 59 g. (0.25 mole) of acid chloride are dissolved in 150 cc. of actone and poured drop by drop, at a temperature from 0 to 5° C., into 29 g. (0.25 mole) of N,N-diethylethylene diamine. There are added 800 cc. of water and 25 cc. of 30% soda. The base of N-(2-diethylaminoethyl) - 2 - methoxy - 3-chloro-5-methylbenzamide formed is precipitated and extracted with 400 cc. of methylene chloride. After evaporation of the solvent, there remains 55 g. of base representing a yield of 70%, which are dissolved in the cold in 50 cc. of alcohol. 20 grams of 85% phosphoric acid are added. The phosphate of substituted benzamide crystallizes, is centrifuged and washed with cold absolute alcohol. The product is a solid white material, having a melting point of 146–147° C.

EXAMPLE XII

*N-(2-diethylaminoethyl)-2-methoxy-4,5-dichlorobenzamide*

99 grams (0.44 mole) of 2-methoxy-4,5-dichlorobenzoic acid are added in three portions to 105 g. (0.9 mole) of thionyl chloride. The mixture is heated for 3 hours on a water bath at 50–60° C. The excess of thionyl chloride is expelled and 105 g. of 2-methoxy-4,5-dichlorobenzoyl chloride are obtained. After dissolution in 200 cc. of methyl ethyl ketone, the acid chloride is then poured drop by drop into 50 g. of N,N-diethylethylene diamine dissolved in 150 cc. of methyl ethyl ketone, the temperature being maintained between 0 and 4° C. The crystallization of the N-(2-diethylaminoethyl)-2-methoxy - 4,5 - dichlorobenzamide hydrochloride begins after about ⅔ of the acid chloride has been introduced.

It is centrifuged after 2 hours of standing and washed on the filter with about 300 cc. of methyl ethyl ketone. The hydrochloride weighs 103 g.; the yield is 67%; and the melting point is 196–198° C. It is easily recrystallized from isopropyl alcohol.

EXAMPLE XIII

*N-(2-diethylaminoethyl)-2-methoxy-4-amino-5-chlorobenzamide*

80 grams (0.3 mole) of N-(2-diethylaminoethyl)-2-methoxy-4-aminobenzamide are dissolved in small portions in 150 cc. of acetic acid. The mixture is cooled and 45 g. (0.45 mole) of acetic anhydride are added, and the solution obtained is heated for two hours on a water bath. After cooling, the solution is decanted into a round-bottomed flask with a stirrer, a thermometer and a tube for introducing the chlorine. It is stirred and the current of chlorine is passed through, the temperature being maintained between 20 and 25° C. The stirring is continued for one hour after the completion of the absorption of the chlorine.

The mixture obtained is poured into 2 liters of water and the base is precipitated with 30% soda. The precipitated base is extracted with 400 cc. of methylene chloride. After evaporation of the solvent, the N-(2-diethylaminoethyl) - 2 - methoxy-4-acetamino-5-chlorobenzamide formed crystallizes. The melting point is 86–87° C. and the yield is 95%.

To obtain the corresponding amino derivative, 109 g. of base are heated under agitation in a round-bottomed flask with 300 cc. of 35–36% concentrated hydrochloric acid and 600 cc. of water. It is heated on a water bath until dissolution is complete, then maintained at boiling point for 90 minutes, cooled, diluted with 1 liter of water, and neutralized with about 350 cc. of 30% soda. The N-(2-diethylaminoethyl)-2-methoxy-4-amino - 5 - chlorobenzamide formed crystallizes, is centrifuged and washed in water. Its melting point is 122° C. and the yield is 74%.

To obtain the corresponding dihydrochloride, the base is dissolved in absolute alcohol (3 volumes) and to that solution is added 5 N alcoholic hydrochloric acid. The dihydrochloride precipitates, is centrifuged and washed with alcohol. It is a solid white material, having a melting point of 134–135° C.

N-(2-diethylaminoethyl)-2-methoxy-4 - ethylamino - 5-chlorobenzamide hydrochloride is produced by the same procedures as described in this example except that N-(2-diethylaminoethyl) - 2 - methoxy-4-ethylaminobenzamide is employed as the starting material. Likewise, if N-(2-diethylaminoethyl)-2-methoxy-4-diethylamino-5-chlorobenzamide hydrochloride is desired, the same method is employed, except that N-(2-diethylaminoethyl)-2-methoxy-4-diethylamino-5-chlorobenzamide is used as the starting material.

The N-(2-diethylaminoethyl)-2-methoxy-4-aminobenzamide used as the starting material in this example may be prepared from o-toluidine. The o-toluidine is initially nitrated with nitric acid to produce 4-nitro-o-toluidine. The 4-nitro-o-toluidine is then converted to 2-hydroxy-4-nitro toluene by heating with nitrous acid. By reacting the resulting 2-hydroxy-4-nitro toluene with dimethyl sulfate, 2-methoxy-4-nitro toluene is formed. The 2-methoxy-4-nitro toluene is oxidized with potassium permanganate to produce 2-methoxy-4-nitrobenzoic acid. The latter substituted benzoic acid is treated with thionyl chloride to form 2-methoxy-4-nitrobenzoyl chloride. A methyl ethyl ketone solution of 2 - methoxy - 4 - nitrobenzoyl chloride is added over a period of about one and one-half hours to a methyl ethyl ketone solution containing an equal molecular quantity of N,N-diethylethylene diamine while stirring and maintaining the temperature between 0 and 5° C. The N-(2-diethylaminoethyl)-2-methoxy-4-nitrobenzamide hydrochloride formed precipitates. It is filtered, washed twice with methyl ethyl ketone, dissolved in alcohol, and reduced catalytically in an absolute isopropyl alcohol solution to form N-(2-diethylaminoethyl)-2-methoxy-4 - amino benzamide. The base is obtained by precipitating with sodium hydroxide.

EXAMPLE XIV

*N-(2-diethylaminoethyl)-2,4-dimethoxy-5-chlorobenzamide*

73 grams (0.337 mole) of 2,4-dimethoxy-5-chlorobenzoic acid are mixed with 80 g. (0.67 mole) of thionyl chloride. The mixture is heated for 5 hours. 2,4-dimethoxy-5-chlorobenzoyl chloride forms in a mass. This is made into a paste with petroleum ether, filtered and washed with petroleum ether. It is a solid white material having a melting point of 144° C. The yield is 74 g., representing a yield of 94%.

The 74 g. of acid chloride are dissolved in 150 cc. of acetone and added to 37 g. of N,N-diethylethylene diamine dissolved in 220 cc. of acetone. The operation is conducted at a temperature between 0 and 5° C. The N-(2-diethylaminoethyl) - 2,4-dimethoxy-5-chlorobenzamide hydrochloride formed precipitates, is centrifuged and washed with 60 cc. of acetone. The product is a white solid having a melting point of 187° C. The yield is 85%.

EXAMPLE XV

*N-(2-diethylaminoethyl)-2,4,5-trimethoxybenzamide*

47 grams (0.22 mole) of 2,4,5-trimethoxybenzoic acid are added in 3 portions to 79 g. (0.44 mole) of thionyl chloride. The reaction is very vigorous. It is heated to about 60° C., the mass becoming liquid in about 4 hours. After cooling, the 2,4,5-trimethoxybenzoyl chloride is precipitated with 300 cc. of petroleum ether, is centrifuged and washed with petroleum ether. The yield is 47 g., representing a yield of 92%.

The acid chloride is dissolved in 300 cc. of ether and poured drop by drop, at a temperature between 0 and 5° C., into 24 g. of N,N-diethylethylene diamine dissolved in 150 cc. of ether. The N-(2-diethylaminoethyl)-2,4,5-trimethoxybenzamide formed precipitates and is centrifuged. 42 grams of product are obtained having a melting point of 158–159° C.

EXAMPLE XVI

*N-(2-diethylaminoethyl)-2-methoxy-3,4,5-trichlorobenzamide*

84 grams (0.33 mole) of 2-methoxy-3,4,5-trichlorobenzoic acid are poured into 118 g. of thionyl chloride (0.66 mole). This is heated for 7 hours on a water bath at 80° C. The excess of thionyl chloride is expelled and 88 g., representing a yield of 97% of 2-methoxy-3,4,5-trichlorobenzoyl chloride are obtained.

The acid chloride is dissolved in 120 cc. of acetone and poured drop by drop, at a temperature between 0 and 5° C. into 38 g. of N,N-diethylethylene diamine dissolved in 150 cc. of acetone. 101 grams, representing an 83% yield of N-(2-diethylaminoethyl)-2-methoxy-3,4,5-trichlorobenzamide hydrochloride, precipitates, is centrifuged and washed on the filter with 100 cc. of acetone. It is a solid white material having a melting point of 92–93° C.

EXAMPLE XVII

*N-(2-diethylaminoethyl)-2-methoxy-4-fluorobenzamide*

To 89 g. (0.52 mole) of 2-methoxy-4-fluorobenzoic acid are added in small portions 124 g. (1.04 moles) of thionyl chloride. When all the acid is dissolved, the solution is heated for 2 hours on a water bath. The excess of thionyl chloride is distilled under vacuum. The 2-methoxy - 4 - fluorobenzoyl chloride crystallizes. The amount recovered is 81 g., representing a yield of 83%. The acid chloride is dissolved in 120 cc. of methyl ethyl ketone and poured drop by drop into 55 g. (0.475 mole) of N,N-diethylethylene diamine dissolved in 200 cc. of methyl ethyl ketone, the reaction mixture being maintained between 0 and 5° C. N-(2-diethylaminoethyl)-2-methoxy-4-fluorobenzamide hydrochloride precipitates. It is allowed to remain for 24 hours, is filtered and washed with methyl ethyl ketone. A white product is obtained having a melting point of 161° C. in a yield of 93%.

EXAMPLE XVIII

*N-(2-diethylaminoethyl)-2-methoxy-5-fluorobenzamide*

74 grams (0.42 mole) of 2-methoxy-5-fluorobenzoic acid are dissolved in the cold in 80 g. of thionyl chloride. 2-methoxy-5-fluorobenzoyl crystallizes immediately. The excess of thionyl chloride is removed under vacuum.

78 grams of the resulting acid chloride are dissolved in 90 cc. of methyl ethyl ketone. The solution of acid chloride is poured drop by drop while the temperature is maintained between 0 and 5° C., into 48 g. (0.42 mole) of N,N-diethylethylene diamine. The N,N-2-diethylaminoethyl-2-methoxy-5-fluorobenzamide hydrochloride precipitates, is centrifuged, and washed on the filter with methyl ethyl ketone. There are obtained 113 g. of product having a melting point of 161–162° C., representing a yield of 90%.

EXAMPLE XIX

*N-(2-diethylaminoethyl)-2-methoxy-4-amino-5-bromobenzamide*

To 119 g. (0.45 mole) of N-(2-diethylaminoethyl)-2-methoxy-4-aminobenzamide dissolved in 200 cc. of acetic acid are added in the cold in small portions 69 g. of acetic anhydride (0.45 mole+excess of 50%). The N-(2-diethylaminoethyl)-2-methoxy-4-aminobenzamide may be prepared as described in Example XIII. The solution obtained is heated for 2 hours on a water bath and then boiled for 15 minutes. It is cooled at 25° C. While agitating constantly and maintaining the temperature between 25 and 30° C., there is added to the solution drop by drop 72 g. of bromine dissolved in 60 cc. of acetic acid. It is agitated for one hour. The mixture obtained is added to one liter of water and the base is precipitated by the addition of 30% soda. The precipitated base is extracted with 40 cc. of methylene chloride. After evaporation of the solvent, the residue is boiled for 2 hours with 390 g. of concentrated hydrochloric acid in 780 cc. of water. It is cooled, diluted with one liter of water, 12 g. of charcoal are added, and the mixture filtered. The base is precipitated with 30% soda. The N-(2-diethylaminoethyl) - 2 - methoxy-4-amino - 5 - bromobenzamide formed crystallizes, is centrifuged and washed with water. A yield of 85 g. of base having a melting point of 129–130° C. is obtained.

To produce the dihydrochloride, the free base is dissolved in 110 cc. of absolute alcohol, 9.6 g. of dry hydrochloric acid dissolved in 35 cc. of alcohol are added, followed by 2.8 cc. of water. The dihydrochloride precipitates, is centrifuged, washed, and dried at 40° C. It was a solid white material having a melting point of 134–135° C.

EXAMPLE XX

*N-(2-diethylaminoethyl)-2-thiomethyl-3,5-dichlorobenzamide*

47 grams (0.18 mole) of 2-thiomethyl-3,5-dichlorobenzoic acid are introduced in small portions into 43 g. of thionyl chloride (0.36 mole). It is heated on a water bath at 40° C., then for 3 hours at 60–70° C. The excess of thionyl chloride is expelled under vacuum and 45 g. (98% yield) of 2-thiomethyl-3,5-dichlorobenzoyl chloride are obtained.

The acid chloride is dissolved in 22 cc. of methyl ethyl ketone and added drop by drop, the temperature being maintained between 0 and 5° C., into a solution of 21 g. of N,N-diethylethylene diamine in 113 cc. of methyl ethyl ketone. The N-(2-diethylaminoethyl)-2-thiomethyl-3,5-dichlorobenzamide hydrochloride crystallizes during the reaction. When the reaction is terminated, the mixture is allowed to remain for 3 hours, is centrifuged, washed with 90 cc. of methyl ethyl ketone and dried at 100° C. There are obtained 59 g. of a solid white material, representing a yield of 88%, and with a melting point of 139–140° C.

Other thioalkyl compounds may be prepared in a similar manner. For example, N-(2-diethylaminoethyl)-2-thiopropyl-3,5-dichlorobenzamide hydrochloride is produced similarly by using 2-thiopropyl-3,5-dichlorobenzoic acid as the starting material instead of the 2-thiomethyl-3,5-dichlorobenzoic acid employed above.

EXAMPLE XXI

*N-(2-diethylaminoethyl)-2-methoxy-3-nitro-5-chlorobenzamide*

45 grams (0.195 mole) of 2-methoxy-3-nitro-5-chlorobenzoic acid are added to 71 g. (0.6 mole) of thionyl chloride. The mixture is heated gently on a water bath, then refluxed little by little to obtain complete dissolution of the mixture. The operation requires about 5 hours. The excess of thionyl chloride is expelled in vacuum. 47 grams (about 96%) of N-(2-diethylaminoethyl)-2-methoxy-3-nitro-5-chloro-benzoyl chloride are obtained.

The 47 g. of acid chloride are dissolved in 24 cc. of methyl ethyl ketone and added drop by drop, the temperature being maintained between 0 and 5° C., to a solution of 22 g. of N,N-diethylethylene diamine in 117 cc. of methyl ethyl ketone. The hydrochloride of N-(2-diethylaminoethyl)-2-methoxy-3-nitro - 5 - chlorobenzamide precipitates during the reaction. It is centrifuged, washed and dried. It is a solid white phosphorescent material having a melting point of 121–122° C. and obtained in a yield of 56.9%.

If desired, the corresponding amino compound, N-(2-diethylaminoethyl)-2-methoxy-3-amino - 5 - chlorobenzamide may be prepared by reducing the N-(2-diethylaminoethyl)-2-methoxy-3-nitro-5-chlorobenzamide in the same manner that N-(2-diethylaminoethyl)-2-methoxy-4-amino-5-chlorobenzamide is produced from its corresponding nitro compound as described in Example XIII.

EXAMPLE XXII

*N-(2-diethylaminoethyl)-2-methoxy-3-chlorobenzamide*

To 36 g. (0.193 mole) of 2-methoxy-3-chlorobenzoic acid are added in several portions 46 g. (0.386 mole) of thionyl chloride. The reaction mixture is heated for 4 hours on a water bath. The excess of thionyl chloride is removed under vacuum. The 2-methoxy-3-chloro-benzoyl chloride obtained (40 g.) is dissolved in 40 cc. of methyl ethyl ketone. The resulting solution is poured drop by drop into 22 g. (0.19 mole) of N,N-diethylethylene diamine dissolved in 100 cc. of methyl ethyl ketone, the reaction mixture being maintained between 0 and 5° C. The N-(2-diethylaminoethyl) - 2 - methoxy-3-chlorobenzamide hydrochloride formed is precipitated and allowed to stand for one night, centrifuged and washed twice with 40 cc. of methyl ethyl ketone. It is a white material having a melting point of 137° C., obtained in a yield of 82.5%.

In the same manner, other N-(tertiary aminoalkyl)-2-methoxy-3-chlorobenzamides may be prepared.

EXAMPLE XXIII

*N-(2-diethylaminoethyl)-2-4-dimethoxy-benzamide*

55 grams (0.3 mole) of 2,4-dimethoxybenzoic acid are poured into 54 g. (0.45 mole) of thionyl chloride and 50 cc. of benzene. The mixture is heated on a water bath until the acid is completely dissolved. The mixture is boiled for one hour under reflux. The benzene and excess thionyl chloride are distilled off. The 2,4-dimethoxybenzoyl chloride obtained is dissolved in 60 cc. of acetone and poured drop by drop into 37 g. (0.3 mole) of N,N-diethylethylene diamine dissolved in 170 cc. of acetone. This reaction is conducted between 0 and 5° C. To the reaction mixture is added 700 cc. of water and 20% ammonia to precipitate the base. The base is extracted with 400 cc. of methylene chloride. The methylene chloride is then removed under vacuum. The residue is recovered in 250 cc. of alcohol at 25° C. To the alcohol solution is added, 22 g. of 85% phosphoric acid previously dissolved in 100 cc. of 95% alcohol. N-(2-diethylaminoethyl)-2-4-dimethoxy benzamide phosphate is precipitated, is centrifuged, washed with 100 cc. of 95% alcohol and recrystallized from methyl alcohol. A white material having a melting point of 182° C. is obtained.

EXAMPLE XXIV

*N-(2-diethylaminoethyl)-2-methoxy-5-aminobenzamide*

To 68 g. of N,N-diethylethylene diamine dissolved in 250 cc. of methyl ethyl ketone is added slowly with agitation 126 g. of 2-methoxy-5-nitrobenzoyl chloride dissolved in 250 cc. of methyl ethyl ketone. During the reaction, the temperature is maintained at about 8° C. The nitrobenzamide hydrochloride obtained is precipitated, is centrifuged, and washed twice with 60 cc. of methyl ethyl ketone. There are obtained 178 g. of product having a melting point of 195° C. and representing a yield of 92%.

The hydrochloride is converted to the base by precipitation with a slight excess of ammonia. The precipitated base is centrifuged. The base having a melting point of 108–109° C. is dissolved in 290 cc. of methyl alcohol and reduced by heating under pressure in the presence of Raney nickel.

After terminating the hydrogenation, the nickel is filtered, the methyl alcohol removed and the dihydrochloride is prepared from the crude base dissolved in 500 cc. of isopropyl alcohol. The dihydrochloride obtained is filtered and recrystallized from 1230 cc. of methanol. There are obtained 136 g. of product having a melting point of 210° C. and representing a yield of 85%. The dihydrochloride crystallizes with 1 molecule of water.

EXAMPLE XXV

*N-(2-diethylaminoethyl)-2-methoxy-4-halobenzamides*

34 grams of N,N-diethylethylene diamine dissolved in 144 cc. of methyl ethyl ketone are reacted with 72 g. of 2-methoxy-4-bromobenzoyl chloride in 180 cc. of methyl ethyl ketone. There are obtained 98 g., which on recrystallization give 91 g. of the hydrochloride salt having a melting point of 172° C. and representing a yield of 87%.

The corresponding 2-ethoxy compound is produced by reacting 47 g. of the diamine in 107 cc. of methyl ethyl ketone with 107 g. of 2-ethoxy-4-bromobenzoyl chloride in 375 cc. of methyl ethyl ketone. Upon recrystallization from isopropyl alcohol, 104 g. of N-(2-diethylaminoethyl)-2-ethoxy-4-bromobenzamide hydrochloride are obtained having a melting point of 149° C. and representing a yield of 69%.

The corresponding N-(2-diethylaminoethyl)-2-ethoxy-4-chlorobenzamide hydrochloride is produced in the same manner, which upon recrystallization from isopropyl alcohol, has a melting point of 144–146° C.

The N-(2-diethylaminoethyl)-2-methoxy-4-chlorobenzamide hydrochloride when produced by the same method has a melting point of 178° C.

The 2-alkoxy-4-halobenzoyl chlorides used as the starting materials for the production of the substituted benzamides of this example are prepared by reacting thionyl chloride in double the quantity theoretically required with 2-alkoxy-4-halobenzoic acid followed by moderate heating at 40–50° C. The melting points and/or boiling points of some of the 2-alkoxy-4-halobenzoyl chlorides are:

2-methoxy-4-chlorobenzoyl chloride, M.P., 69–70° C.
2-methoxy-4-bromobenzoyl chloride, M.P., 83° C.
2-methoxy-4-fluorobenzoyl chloride, B.P., 131–132° C.
2-ethoxy-4-chlorobenzoyl chloride, M.P., 48° C.; B.P., 153–156° C.
2-ethoxy-4-bromobenzoyl chloride, M.P., 53° C.; B.P., 164–165° C.

EXAMPLE XXVI
*N-(2-dialkylaminoalkyl)-2-methoxy-4-aminobenzamide*

The base, N - (2 - diethylaminoethyl) - 2 - methoxy-4-aminobenzamide is prepared as described in Example XIII.

The dihydrochloride is prepared as follows:

A solution containing 108 g. 2-methoxy-4-nitrobenzoyl chloride in 50 cc. of methyl ethyl ketone is added gradually to a solution containing 50 g. of N,N-diethylethylene diamine in 200 cc. of methyl ethyl ketone with agitation and cooling so as to maintain the temperature at less than about 5° C. The addition of the acid chloride requires about 90 minutes. Towards the latter stage of the reaction the benzamide hydrochloride formed precipitates. The mixture is allowed to stand 2 hours at room temperature after the end of the reaction, the precipitate is filtered and washed over the filter with two 50 cc. portions of methyl ethyl ketone. The nitro derivative is then reduced catalytically in solution in isopropyl alcohol with nickel (or palladium-carbon) as a catalyst. The alcohol is evaporated and the amino derivative base thus obtained is precipitated with an excess of sodium hydroxide. This base is then treated in solution in absolute isopropyl alcohol with a stream of gaseous hydrochloric acid. There is precipitated by this means in near-quantitative yield the dihydrochloride of N - (2 - diethylaminoethyl) - 2-methoxy-4-aminobenzamide, which is separated in a pure state by simple draining or centrifuging. The melting point of the product is about 153° C.

The compound was tested for acute toxicity on male mice with the following results: the $LD_{50}$ had the following values in mg. per kg. of body weight:

| | |
|---|---|
| Intravenously | 129 |
| Intraperitoneally | 240 |
| Subcutaneously | 510 |
| Orally | 1650 |

The compound therefore has very low toxicity when compared with chlorpromazine.

The anti-emetic activity of the compound on the vomitory centers was tested on the dog using apomorphine according to the technique of Chen and Ensor as modified by Ducrot and P. Decourt. Groups of four dogs were tested. The apomorphine was given subcutaneously in an amount of 0.10 mg./kg. The compound was given 30 minutes before the apomorphine, also subcutaneously.

The number of vomits occurring within 30 minutes following injection of apomorphine was counted. It was found that the percentage protection against vomiting was 100% (no vomits) at doses from 20 mg./kg. to 1 mg./kg. (mg./kg. is the milligram dosage per kilogram of body weight), and that 53% protection was still present at doses of 0.125 mg./kg. The compound therefor appears to be as active as chloropromazine (of Courvoisier, Arch. Int. Pharmacol., 1953, 92, 305), and more active than trimethobenzamide (of Schallek, J. et Coll. P.E.T., 1959; 126, 270).

The following table compares the compound with other known anti-emetics, and determines the therapeutic index of the compound.

PROTECTIVE DOSAGE AND S.C. ACTIVITY INDEX

| Substance | Dose for 100% protection (mg./kg.) | S.C. activity index (dog) |
|---|---|---|
| N-(diethylaminoethyl)-2-methoxy-4-aminobenzamide dihydrochloride | 2.5 | 8 |
| Chloropromazine | 2 | 10 |
| O-chloroprocainamide | 10 | 12 |
| Trimethobenzamide | 20 | 1 |

THERAPEUTIC INDEX

| Substance | IV toxicity index (mouse) | S.C. activity index (dog) | Activity/ toxicity |
|---|---|---|---|
| N-(diethylaminoethyl)-2-methoxy-4-aminobenzamide hydrochloride | 1 | 8 | 8 |
| Chloropromazine | 5.6 | 10 | 1.7 |
| O-chloroprocainamide | 1.9 | 2 | 1 |
| Trimethobenzamide | 1 | 1 | 1 |

The persistence of activity of the compound, when given in doses of 5 mg./kg., appears to be greater than 2 hours.

In addition to its anti-emetic properties, a pharmacological study of the compound show it to possess definite anti-fibrillating action. The compound has weak local anesthetic action and weak hypotensor action. There is no depressive action on the central nervous system or on the autonomous nervous system, at the doses used for anti-emetic purposes. The compound has practically no anti-histaminic action.

The compound possesses action on the physiological vomiting system, and can be used therapeutically as an anti-emetic without any objectionable secondary reactions. This is confirmed by clinical observations in which the product was given as 25 mg. tablets, in progressively increasing doses from 2 to 8 tablets per day. The treatment did not produce any digestive disorders or other sign of intolerance, vomiting ceased on the second day and did not reappear after the treatment.

The compound may be given in the following principal forms according to desired use:

(a) Sugar-coated 25 mg. tablets at the rate of 6 to 8 tablets per day;

(b) Injectible ampoules or aqueous solutions for use in aerosol or other sprays in dosages of 50 mg. per cc. at the rate of 3 to 4 daily;

(c) Suppositories of 100 mg. at the rate of 3 daily;

(d) Granular sucrose for use by children, 10 mg. per dose, equivalent to one level teaspoon (about 4 g); and, (e) Sugar syrup form for children, at a dosage of 10 mg. per 5 cc. teaspoon.

Other N-(2-dialkylaminoalkyl)-2-alkoxy-4-aminobenzamides and N-(2-dialkylaminoalkyl)-4 substituted aminobenzamides are useful for the treatment of emesis and behavior disturbances including the following:

N-(2-diethylaminoethyl)-2-methoxy-4-acetaminobenzamide;

N-(2-diethylaminoethyl)-2-methoxy - 4 - ethylaminobenzamide;

N-(2-dimethylaminopropyl)-2-methoxy - 4 - aminobenzamide;

N-(2-diethylaminopropyl)-2-methoxy - 4 - aminobenzamide.

The four compounds have been subjected to pharmacological study similar to what was described above for N-(2-diethylaminoethyl)-2-methoxy-4 - aminobenzamide with generally similar results.

The N-(2-diethylaminoethyl)-2-methoxy-4-acetaminobenzamide is prepared by treating N-(2-diethylaminoethyl)-2-methoxy-4-aminobenzamide with an acetylating mixture such as acetic anhydride. 51 grams (0.192 mole) of N-(2-diethylaminoethyl)-2-methoxy-4-aminobenzamide base are dissolved in 102 cc. of hot absolute alcohol. The solution is heated to 20° C., and 25 g. (theory+30% excess) acetic anhydride are added in small increments. The temperature of the reaction medium rises promptly and the medium is thereafter heated at reflux for 3½ hours. The mixture is allowed to cool, and 1 liter iced water is poured into it. 30% sodium hydroxide solution is added until neutralization has been achieved. The acetyl derivative precipitates. It is filtered and washed with water until it is neutral. It is a white crystalline solid melting at about 118–120° C.

To produce N-(2-diethylaminoethyl)-2-methoxy-4-ethylaminobenzamide, 33 g. of N-(2-diethylaminoethyl)-2-methoxy-4-aminobenzamide base are dissolved in 70 cc. absolute alcohol. At the same time, 7 g. (0.125 mole+30% excess) of the ethyl aldehyde in 35 cc. alcohol is prepared separately, and cooled to the range from 0–5° C. This solution is slowly added to the alcoholic base solution. The reaction is moderate. The reaction mixture is placed in an autoclave, rinsed with 35 cc. of alcohol, and Raney nickel catalyst is added in an amount of one teaspoon. The mixture is heated to 85° C. and hydrogenation is commenced. When hydrogenation is complete the nickel is filtered out, the mixture is washed with a small amount of alcohol and is evaporated to dryness. The base and its salts do not crystallize. The molecular weight of the product was determined acidimetrically as 293. The theoretical value is 293. For the pharmacological study of the compound a neutral solution of the monohydrochloride is easily prepared.

To produce N-(2-dimethylaminopropyl)-2-methoxy-4-aminobenzamide, the chloride of 2-methoxy-4-nitrobenzoyl is treated with a solution of 3-dimethylaminopropylamine. A solution containing 36.6 g. (0.17 mole) of 2-methoxy-4-nitro-benzoyl chloride in 15 cc. acetone is added gradually to a solution containing 17.3 g. (0.17 mole) of 3-dimethylaminopropylamine dissolved in 75 cc. acetone while stirring and cooling to maintain the temperature from 0 to 5° C. The addition of the acid chloride requires about 90 minutes. Toward the end of the reaction the benzamide hydrochloride formed precipitates. It is allowed to stand 2 hours at room temperature after the reaction is completed, and the precipitate is then filtered and washed over the filter twice with 25 cc. acetone. The nitro derivative dissolved in alcohol is then reduced catalytically. The alcohol is eliminated and the resulting amino derivative base is then precipitated with an excess of sodium hydroxide. To purify the base, it was dissolved in the calculated quantity of normal hydrochloric acid and was reprecipitated with sodium hydroxide. The base which crystallizes is drained dry, washed with water until neutral and dried. The resulting solid melts at 68–70° C.

N - (2 - diethylaminopropyl)-2-methoxy-4-aminobenzamide is prepared similarly to N-(2-dimethylaminopropyl)-2-methoxy-4-aminobenzamide by treating 2-methoxy-4-nitrobenzoyl chloride with a solution of 3-diethylaminopropylamine. The nitro amide is reduced catalytically and the resulting amino derivative is recovered.

Pharmacological data resulting from tests on the four benzamides is summarized in the following tables:

(1) Lethal dose$_{50}$ of the base, by intravenous injection:

| Compound: | LD$_{50}$ (mg. per kg. of body weight) |
|---|---|
| N-(2-diethylaminoethyl) - 2 - methoxy-4-acetaminobenzamide (#1) | 92.5 |
| N - (2-diethylaminoethyl)-2-methoxy-4-ethylaminobenzamide (#2) | 21.5 |
| N-(2-dimethylaminopropyl) - 2 - methoxy-4-aminobenzamide (#3) | 145.6 |
| N - (2 - diethylaminopropyl) - 2 - methoxy-4-aminobenzamide (#4) | 26.6 |

(2) Percent protection against vomiting (of the base) as determined by the above identified method on four dog-groups:

| Compound | Dose | |
|---|---|---|
| | Greater than 2.5 mg./kg. of body weight, protection percent | 2.5 mg./kg., percent |
| #1 | 100 | 85 |
| #2 | 100 | 100 |
| #3 | 100 | 50 |
| #4 | 100 | 55 |

These compounds, like N - (2 - diethylaminoethyl)-2-methoxy-4-aminobenzamide, are shown to act on the physiological vomiting system and are useful anti-emetics.

The four last-mentioned benzamides have also been shown to have the same properties as N-(2-diethylaminoethyl)-2-methoxy-4-aminobenzamide in regard to their depressive, local anesthetic, antifibrillating, hypotensive and histaminic activities.

The four compounds listed in the above table may be administered as injectable solutions or aerosol solutions, suppositories, saccharide granulate, or in syrup form. Compounds #1, #3 and #4 may also be administered as sugar-coated tablets. Since it has not been possible to isolate compound #2 in solid form, it cannot be used as the sugar-coated tablets.

The posology of the four compounds can be summarized as follows depending on desired use:

| Compound | Tablets per day | Solution per day | Suppositories per day | Granulates | Syrup |
|---|---|---|---|---|---|
| #1 | 25 mg., 6–10 | 50 mg./cc., 3–4 | 100 mg., 2–3 | 10 mg./dose | 10 mg./5 cc. |
| #2 | | 50 mg./cc., 2–3 | 50 mg., 2–3 | 5 mg./dose | 5 mg./5 cc. |
| #3 | 25 mg., 5–8 | 50 mg./cc., 2–4 | 100 mg., 2–3 | 10 mg./dose | 10 mg./5 cc. |
| #4 | 25 mg., 2–5 | 50 mg./cc., 2–3 | 50 mg., 2–3 | 5 mg./dose | 5 mg./5 cc. |

Other examples of N-(2-diethylaminoethyl)-2-alkoxy-4-amino and 4-substituted amino benzamides which are useful in the treatment of emesis and behavior disturbances are N - (2 - diethylaminoethyl)-2-ethoxy-4-ethylaminobenzamide; N - (2-diethylaminoethyl)-2-ethoxy-4-aminobenzamide; and N - (2 - diethylaminoethyl)-2-propoxy - 4 - aminobenzamide. The latter two compounds may be prepared in the same manner that N-(2-diethylaminoethyl)-4-methoxy-4-aminobenzamide is produced as described in this example except that 2-ethoxy-4-nitrobenzoyl chloride or 2-propoxy-4-nitrobenzoyl chloride is used as a starting material instead of 2-methoxy-4-nitrobenzoyl chloride. N-(2-diethylaminoethyl)-2-ethoxy-4-ethylaminobenzamide may be produced by the same method as described above for the preparation of N-(2-diethylaminoethyl)-2-methoxy - 4 - ethylaminobenzamide except that N-(2-diethylaminoethyl)-2-ethoxy-4-aminobenzamide base is used as the starting material instead of the corresponding 2-methoxy base.

Desirably, the substituted benzamides, such as those described in Examples I through XXVI are associated with solid or liquid pharmaceutically acceptable carriers for oral or parenteral administration in the treatment of emesis or behavior disturbances. The substituted benzamides and carriers may be in the form of capsules, tablets, powders, sterile solutions of water or other solvents or other dosage forms. The substituted benzamides may be admixed with diluents and adjuvants, such as lactose, gums, stearic acid or talc. Conveniently, the substituted benzamides may be the dosage forms heretofor described for the administration of N-(2-diethylaminoethyl)-2-methoxy-4-aminobenzamide. The daily dosage may be within the range of 1/100 to 1½ grams such as 1/50 to 1 gram.

What is claimed is:

1. The method of treating a mammal afflicted with emesis, said method comprising administering to said mammal a composition selected from the class consisting of benzamides and nontoxic salts thereof, said benzamides having the formula:

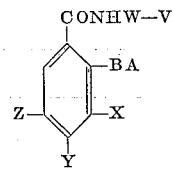

in which V is a member selected from the class consisting of groups having the formulas:

and

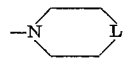

in which $R_1$ and $R_2$ are lower alkyl; L is a member selected from the class consisting of oxygen, methylene, and members having the formula: NR in which R is selected from the class consisting of hydrogen, lower alkyl and lower alkylsulfamoyl; W is lower alkylene of 1 to 4 carbon atoms; A is lower alkyl; B is selected from the class consisting of sulfur and oxygen; and X, Y and Z are selected from the class consisting of hydrogen, halogen, lower alkoxy, nitro, amino, lower alkylamino, di lower alkylamino, lower alkanoyl, lower alkanoylamino, cyano, lower alkylmercapto, sulfamoyl, lower alkylsulfamoyl, di lower alkylsulfamoyl and halomethyl.

2. The method of treatment in accordance with claim 1, in which the daily dosage of the substituted benzamide is 1/100 to 1½ grams.

3. The method of treatment in accordance with claim 1, in which the daily dosage of the substituted benzamide is 1/50 to 1 gram.

4. The method of treating a mammal afflicted with emesis which comprises administering to said mammal N-(diethylaminoethyl)-2-methoxy-4-aminobenzamide.

5. The method of treating a mammal afflicted with emesis which comprises administering to said mammal N-(diethylaminoethyl)-2-methoxy-4-acetaminobenzamide.

6. The method of treating a mammal afflicted with emesis which comprises administering to said mammal N - (diethylaminoethyl)-2-methoxy-4-ethylaminobenzamide.

7. The method of treating a mammal afflicted with emesis which comprises administering to said mammal N-(dimethylaminopropyl)-2-methoxy-4-aminobenzamide.

8. The method of treating a mammal afflicted with emesis which comprises administering to said mammal N-(2 - diethylaminoethyl) - 2-methoxy-3-nitro-5-chlorobenzamide.

9. The method of treating a mammal afflicted with emesis which comprises administering to said mammal N-(2-diethylaminoethyl)-2-methoxy-4-fluorobenzamide.

10. The method of treating a mammal afflicted with emesis which comprises administering to said mammal a nontoxic salt of N-(diethylaminoethyl)-2-methoxy-4-aminobenzamide.

11. The method of treating a mammal afflicted with emesis which comprises administering to said mammal a nontoxic salt of N-(diethylaminoethyl)-2-methoxy-4-acetaminobenzamide.

12. The method of treating a mammal afflicted with emesis which comprises administering to said mammal a nontoxic salt of N-(diethylaminoethyl)-2-methoxy-4-ethylaminobenzamide.

13. The method of treating a mammal afflicted with emesis which comprises administering to said mammal a nontoxic salt of N - (dimethylaminopropyl) - 2-methoxy-4-aminobenzamide.

14. The method of treating a mammal afflicted with emesis which comprises administering to said mammal a nontoxic salt of N-(2-diethylaminoethyl) - 2 - methoxy-3-nitro-5-chlorobenzamide.

15. The method of treating a mammal afflicted with emesis which comprises administering to said mammal a nontoxic salt of N-(2-diethylaminoethyl) - 2 - methoxy-4-fluorobenzamide.

References Cited by the Examiner

UNITED STATES PATENTS

| | | | |
|---|---|---|---|
| 2,691,025 | 10/1954 | Clinton | 167—65 |
| 2,691,041 | 10/1954 | Clinton | 260—559 |
| 2,819,305 | 1/1958 | Lott | 260—559 |

OTHER REFERENCES

Bing: Acta Pharm. Toxicol., vol. 4, pp. 199–204, 1948.
Buchi: Helv. Chem. Acta, vol. 34, pp. 1002–1013, 1951.
Way: J. Pharm. Exper. Ther., vol. 108, pp. 450–460, 1953.

JULIAN S. LEVITT, *Primary Examiner.*

MORRIS O. WOLK, *Examiner.*